(12) United States Patent  (10) Patent No.: US 8,949,723 B2
Nomura  (45) Date of Patent: Feb. 3, 2015

(54) FILE TRANSFER METHOD, FILE TRANSFER APPARATUS, AND FILE TRANSFER PROGRAM

(75) Inventor: Masaru Nomura, Tokyo (JP)

(73) Assignee: Sony Corporation (JP)

( * ) Notice: Subject to any disclaimer, the term of this patent is extended or adjusted under 35 U.S.C. 154(b) by 882 days.

(21) Appl. No.: 12/287,640

(22) Filed: Oct. 10, 2008

(65) Prior Publication Data

US 2009/0106666 A1    Apr. 23, 2009

(30) Foreign Application Priority Data

Oct. 18, 2007  (JP) .............................. P2007-270821

(51) Int. Cl.
  *G06F 3/048*    (2013.01)
  *G06F 17/30*    (2006.01)
(52) U.S. Cl.
  CPC ............................... *G06F 17/30126* (2013.01)
  USPC ........................................ 715/748; 715/769
(58) Field of Classification Search
  CPC ................... G06F 17/30268; G06F 17/30067; G06F 17/30126
  USPC .................................................. 715/748, 769
  See application file for complete search history.

(56) References Cited

U.S. PATENT DOCUMENTS

| 5,978,016 | A  | * | 11/1999 | Lourette et al. | 348/64 |
| 6,085,251 | A  | * | 7/2000  | Fabozzi, II | 709/230 |
| 6,191,807 | B1 | * | 2/2001  | Hamada et al. | 348/14.07 |
| 6,507,363 | B1 | * | 1/2003  | Anderson et al. | 348/231.9 |
| 6,803,929 | B2 | * | 10/2004 | Hinegardner et al. | 715/769 |
| 7,117,256 | B1 | * | 10/2006 | Blinn | 709/219 |
| 7,206,804 | B1 | * | 4/2007  | Deshpande et al. | 709/203 |
| 7,243,101 | B2 | * | 7/2007  | Itou | 382/224 |
| 7,296,025 | B2 | * | 11/2007 | Kung et al. | 707/608 |

(Continued)

FOREIGN PATENT DOCUMENTS

JP   2000-194474 A   7/2000
JP   2003-108281 A   4/2003

(Continued)

OTHER PUBLICATIONS

CoolUtils.com Total Image Converter Image Converter: convert JPG, Gif, BMP, PCX, TIFF, Raw file formats Wayback Archived Sep. 15, 2007 3 pages.*

(Continued)

*Primary Examiner* — Andrea Long
(74) *Attorney, Agent, or Firm* — Lerner, David, Littenberg, Krumholz & Mentlik, LLP

(57) ABSTRACT

A method for transferring a content data file stored in a storage unit from a file transfer apparatus to an external device is provided. The method includes displaying a file display window and a file transfer window on a display unit so that the file transfer window is viewable at any time, where the file display window includes at least one file identification image for identifying one of at least one data file and the file transfer window is used for receiving a request for transferring a data file to the external device, and, upon detecting a drag and drop operation of a file identification image displayed in the file display window into the file transfer window, reading the data file corresponding to the file identification image from the storage unit and writing the data file to the external device using a transfer processing unit of the file transfer apparatus.

13 Claims, 12 Drawing Sheets

(56) References Cited

U.S. PATENT DOCUMENTS

| | | | |
|---|---|---|---|
| 7,783,985 B2* | 8/2010 | Indiran et al. | 715/769 |
| 2002/0140746 A1* | 10/2002 | Gargi | 345/853 |
| 2002/0184224 A1* | 12/2002 | Haff et al. | 707/10 |
| 2003/0065675 A1* | 4/2003 | Gritzbach et al. | 707/102 |
| 2003/0076362 A1* | 4/2003 | Terada | 345/781 |
| 2003/0200229 A1* | 10/2003 | Cazier | 707/200 |
| 2004/0004663 A1* | 1/2004 | Kahn et al. | 348/207.1 |
| 2004/0199514 A1* | 10/2004 | Rosenblatt et al. | 707/10 |
| 2004/0264810 A1* | 12/2004 | Taugher et al. | 382/305 |
| 2005/0024513 A1 | 2/2005 | Hayashi et al. | |
| 2005/0091596 A1* | 4/2005 | Anthony et al. | 715/712 |
| 2005/0131902 A1* | 6/2005 | Saika | 707/10 |
| 2005/0131923 A1* | 6/2005 | Noguchi et al. | 707/100 |
| 2005/0289237 A1* | 12/2005 | Matsubara et al. | 709/232 |
| 2006/0020904 A1* | 1/2006 | Aaltonen et al. | 715/850 |
| 2008/0229248 A1* | 9/2008 | Fagans et al. | 715/838 |
| 2008/0307367 A1* | 12/2008 | Garrison et al. | 715/853 |
| 2009/0030971 A1* | 1/2009 | Trivedi et al. | 709/203 |
| 2009/0237728 A1* | 9/2009 | Yamamoto | 358/1.15 |
| 2009/0284611 A1* | 11/2009 | Wood et al. | 348/211.1 |

FOREIGN PATENT DOCUMENTS

| | | |
|---|---|---|
| JP | 2005-033710 A | 2/2005 |
| JP | 2005-033712 A | 2/2005 |
| JP | 2006-172193 A | 6/2006 |

OTHER PUBLICATIONS

Monkey Job Systems FoldMonkey 2005 11 pages.*
The Focal Encyclopedia of Photography, 4$^{th}$ Edition p. 414 Published Apr. 25, 2007.*
Chad www.viterbo.edu/uploadedFiles/about/offices/lit/backup_Flash.pdf Wayback Archived Aug. 29, 2006 3 pages.*
Webopedia.com "system tray" last modified Mar. 12, 2002, Internet Archive Wayback Machine archived data Aug. 20, 2002 2 pages.*
Office Action from Korean Application No. 10-2008-0089070, dated May 28, 2014.

* cited by examiner

FILE TRANSFER METHOD, FILE TRANSFER APPARATUS, AND FILE TRANSFER PROGRAM

CROSS REFERENCE TO RELATED APPLICATION

The present application claims priority from Japanese Patent Application No. JP 2007-270821 filed in the Japanese Patent Office on Oct. 18, 2007, the entire content of which is incorporated herein by reference.

BACKGROUND OF THE INVENTION

1. Field of the Invention

The present invention relates to a file transfer method, a file transfer apparatus, and a file transfer program for transferring a content data file stored in a storage unit from a file transfer apparatus to a storage area of an external device and, in particular, to a file transfer method, a file transfer apparatus, and a file transfer program for allowing data file transfer to be executed through a simple operation.

2. Description of the Related Art

In general, image data captured by, for example, a digital still camera is transferred to a personal computer (PC) and is stored and held in the PC. Accordingly, a large number of image data items are stored in a PC. Recently, to assist users to organize and browse the image data items easily, image management software has been developed.

For example, some image management software protects against overwriting of an image file stored in a PC by referring to a storage log and file names when an image file stored in a digital still camera is transferred to the PC (refer to, for example, Japanese Unexamined Patent Application Publication No. 2005-33710, paragraphs [0056] to [0063], and FIG. 11). In addition, some image management software automatically sorts image data items stored in a PC using photograph date and time and displays the image data items in areas corresponding to the photograph dates and times (refer to, for example, Japanese Unexamined Patent Application Publication No. 2005-33712, paragraphs [0171] to [0176], and FIG. 30).

In addition, in many cases, image data stored in, for example, a PC is transferred to a portable device via a communication cable in order to play back and view the image data on the portable device. For example, recently, some portable music players have had a function of receiving still image data from a PC as well as audio data so that a user can view the still image data on a display. Furthermore, some image management software has had a function of transferring image data stored in a PC to a portable device via a communication cable.

SUMMARY OF THE INVENTION

However, when transferring image data to a portable device using the above-described image management software, users want to perform an operation simpler than that currently performed. For example, current image management software is operated through a large number of operation steps from when a user selects an image data item to be processed to when the image data is actually transferred to a portable device. For example, a user is prompted to select or create a folder of a portable device into which image data is to be transferred, and a user is prompted to perform an operation for converting image data into a format that is suitable for the display capability of a portable device to which image data is to be transferred. In addition, the user may waste their time from when transfer of image data is started to when the transfer is completed, since performance of other operations are not allowed during the data transfer. As a result, the user may feel that the operation is troublesome.

Accordingly, the present invention provides a file transfer method, a file transfer apparatus, and a file transfer program for allowing data file transfer to be executed through a simple operation.

According to an embodiment of the present invention, a method for transferring a content data file stored in a storage unit from a file transfer apparatus to a storage area of an external device is provided. The method includes the steps of (a) displaying a file display window and a file transfer window on a display unit using display processing means of the file transfer apparatus so that the file transfer window is displayed at a location at which the file transfer window is not hidden by the file display window, where the file display window includes at least one file identification image for identifying one of at least one data file stored in the storage unit and the file transfer window is used for receiving a request for transferring a data file to the external device, and, upon detecting a drag and drop operation of a file identification image displayed in the file display window into the file transfer window using input detecting means of the file transfer apparatus, (b) reading the data file corresponding to the file identification image from the storage unit and writing the readout data file to the storage area of the external device using transfer processing means of the file transfer apparatus.

In such a file transfer method, the display processing means displays a file display window and a file transfer window on a display unit first. At least one file identification image for identifying one of at least one data file stored in the storage unit is displayed in the file display window. The file transfer window is used for receiving a request for transferring a data file to the external device. The file transfer window is displayed at a location where the file transfer window is not hidden by the file display window, so that a user can view the file transfer window at any time. By dragging and dropping a file identification image displayed in the file display window into the file transfer window, a request of transfer of the data file corresponding to the file identification image is made. When the input detecting means detects such a user input operation, the transfer processing means reads the data file to be transferred from the storage unit and writes the readout data file to a storage area of the external device.

According to the file transfer method of the embodiment of the present invention, by simply dragging and dropping a file identification image displayed in the file display window into the file transfer window that is viewable at any time, the user can transfer a desired data file to an external device.

DESCRIPTION OF THE PREFERRED EMBODIMENTS

Various exemplary embodiments of the present invention are described in detail below with reference to the accompanying drawings.

Figure 1:
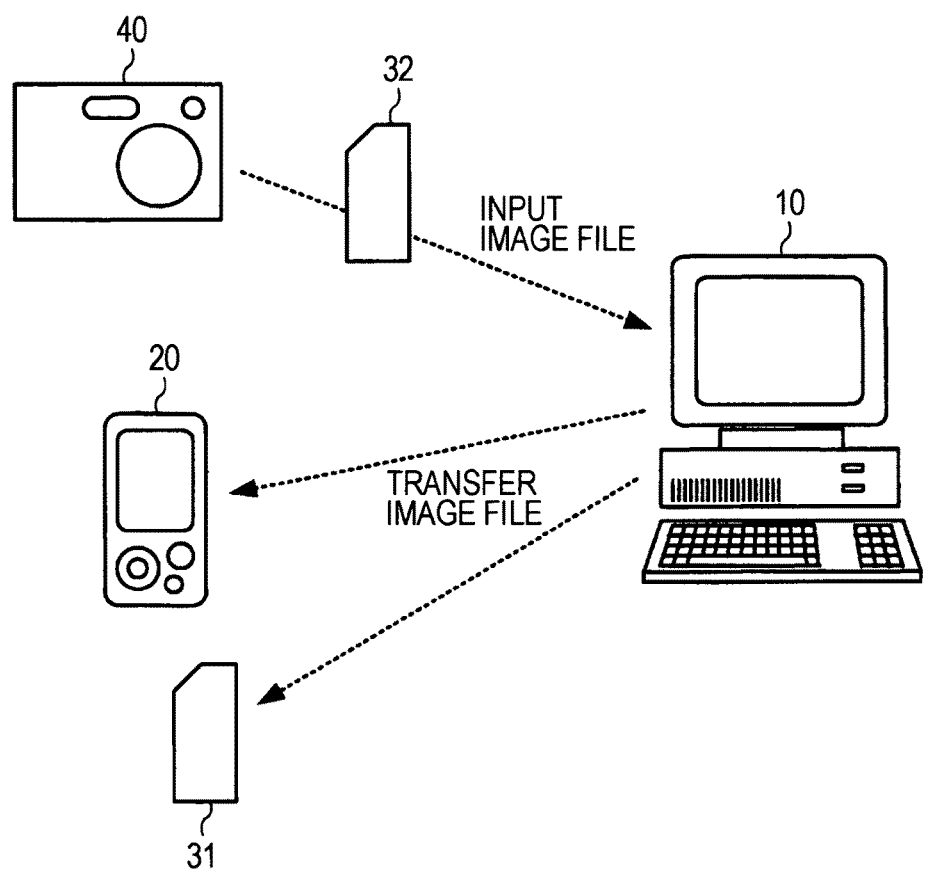
FIG. 1 illustrates an exemplary system configuration including a file transfer apparatus and peripheral devices thereof according to an embodiment of the present invention.

FIG. 1 illustrates an exemplary system configuration including a file transfer apparatus and peripheral devices thereof according to an embodiment of the present invention.

According to the present embodiment, as an example, a still image file serving as a content data file is stored in a file transfer apparatus and is then transferred to an external device. As shown in FIG. 1, a personal computer (PC) 10 functions as a file transfer apparatus that transfers an image file by executing an image transfer program described below. An image file is transferred from the PC 10 to an external device via a communication cable or wireless communication and is stored in a storage area of the external device. In FIG. 1, an example of such an external device is a portable image playback device (a viewer) 20. In addition, an image file may be transferred from the PC 10 to an external device using a removable recording medium. In FIG. 1, an example of such a recording medium is a memory card 31 including a flash memory.

In addition, according to the present embodiment, the PC 10 functions as a file management apparatus that manages image files transferred from external devices by executing a file management program described below. For example, a digital still camera (DSC) 40 captures an image and generates an image file. The image file is input to the PC 10 using a memory card 32 or a communication cable and is stored in a memory area of the PC 10.

Figure 2:
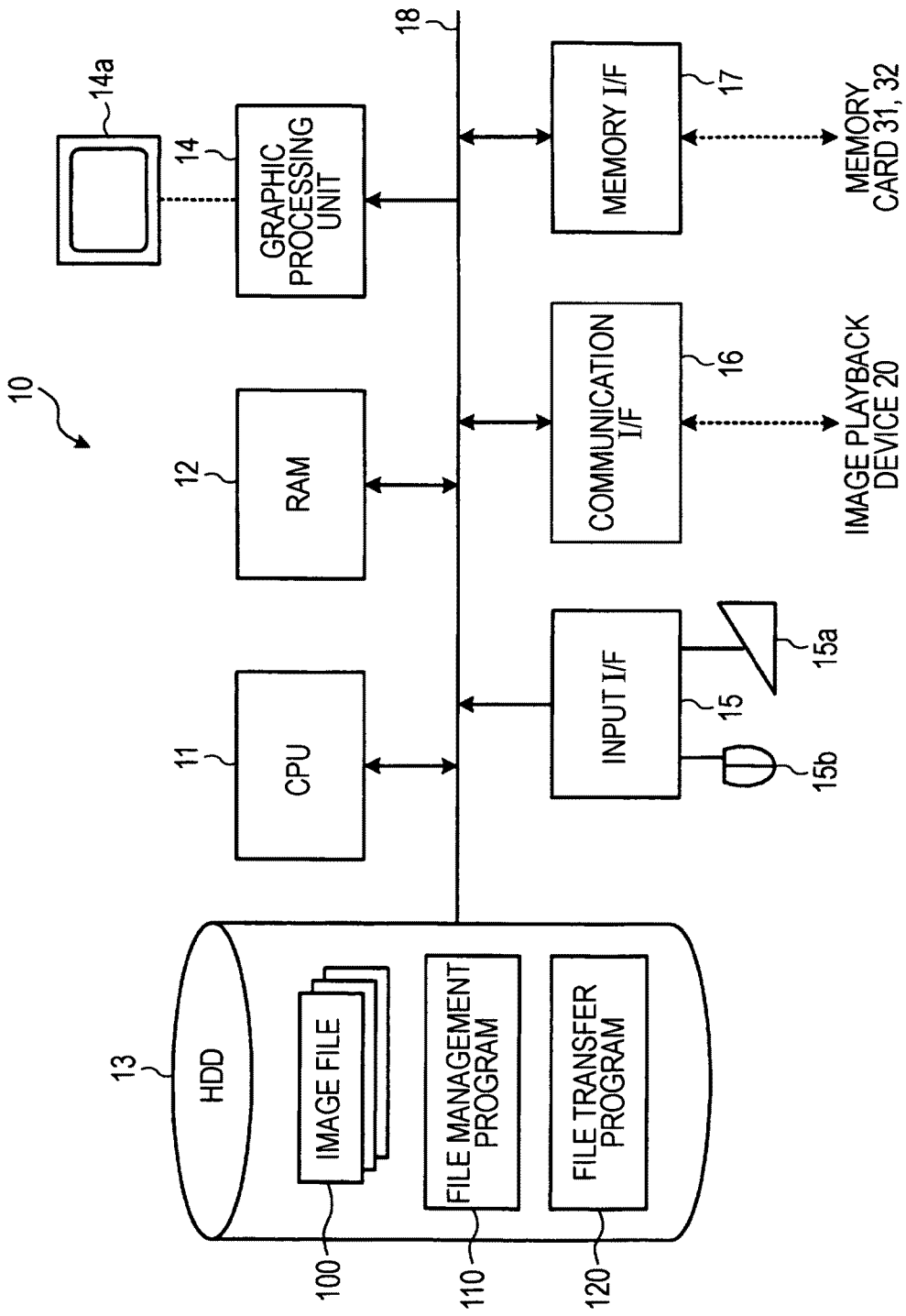
FIG. 2 is a block diagram of an exemplary hardware configuration of a file management and transfer apparatus (a PC)

FIG. 2 is a block diagram of an exemplary hardware configuration of a file management/transfer apparatus (a PC).

As shown in FIG. 2, the PC 10 serving as a file management/transfer apparatus includes a central processing unit (CPU) 11, a random access memory (RAM) 12, a hard disk drive (HDD) 13, a graphic processing unit 14, an input interface (I/F) 15, a communication interface (I/F) 16, and a memory interface (I/F) 17, which are connected to one another via a bus 18.

The CPU 11 performs overall control of the PC 10. The RAM 12 temporarily stores at least part of a program executed by the CPU 11 and a variety of data items used for execution of the program.

The HDD 13 stores an operating system (OS), application programs, and a variety of data items. In particular, according to the present embodiment, the HDD 13 stores a plurality of image files 100, a file management program 110 that manages these image files 100, and a file transfer program 120 that transfers the stored image files 100 to an external device.

A monitor 14a is connected to the graphic processing unit 14. The graphic processing unit 14 displays an image on a screen of the monitor 14a under the control of the CPU 11. Input units, such as a keyboard 15a and a mouse 15b, are connected to the input I/F 15. The input I/F 15 transmits signals from the input units to the CPU 11 via the bus 18.

The communication I/F 16 is connected to an external device using, for example, a communication cable (not shown) so as to communicate data with the external device. According to the present embodiment, information is communicated between the PC 10 and the image playback device 20 via the communication I/F 16. For example, an I/F circuit based on a universal serial bus (USB) standard can be used for the communication I/F 16. In addition, the communication I/F 16 may facilitate wireless communication of information.

The memory I/F 17 includes a memory slot that removably holds a memory card (e.g., the memory card 31 or 32 shown in FIG. 1). The memory I/F 17 writes data to the memory card disposed in the memory slot and reads data from the memory card under the control of the CPU 11.

While the present embodiment is described with reference to the image files 100 that are stored in the storage unit (the HDD 13) incorporated in the PC 10 and that are transferable to the external device (the image playback device 20), an image file stored in an external storage unit connected to the PC 10 via the communication I/F 16 may be transferred to the external device.

Figure 3:
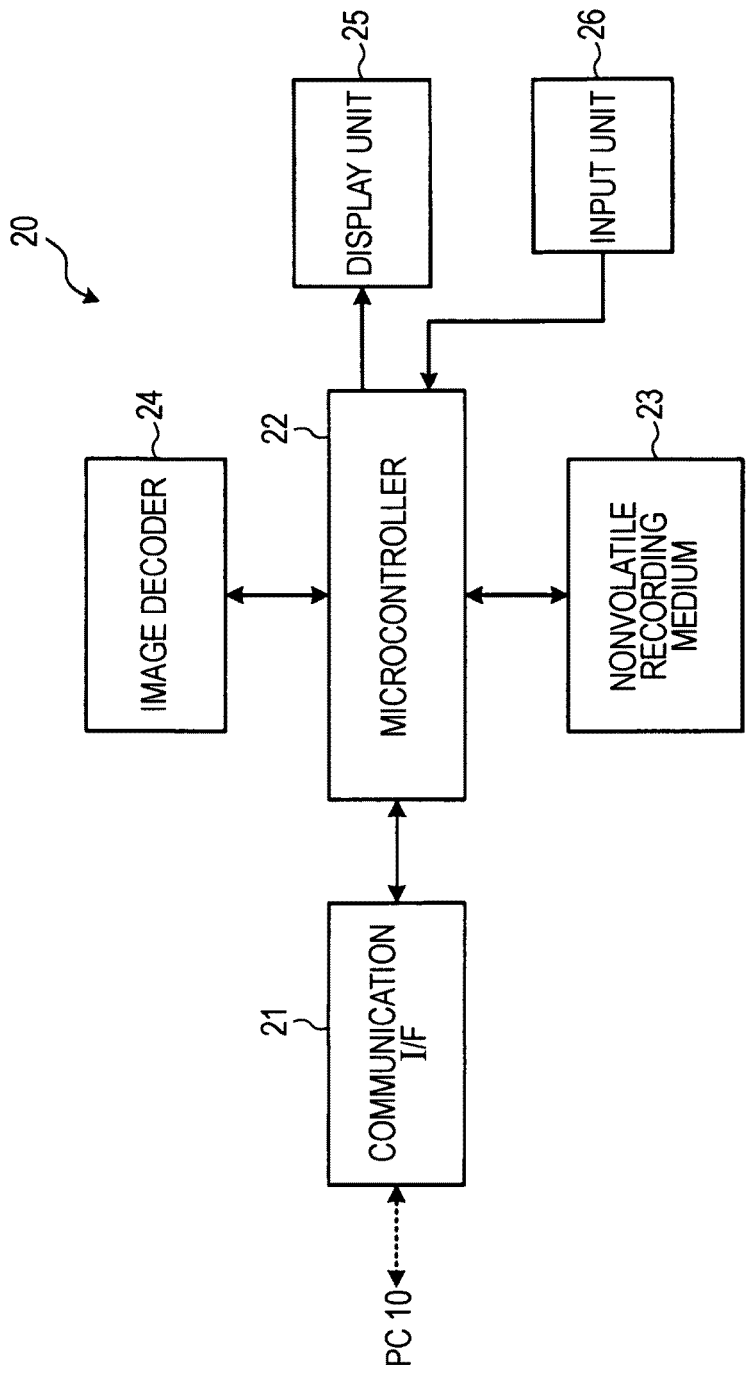
FIG. 3 is a block diagram of an exemplary internal configuration of an image playback device that receives a transferred image file.

FIG. 3 is a block diagram of an exemplary internal configuration of the image playback device that receives a transferred image file.

As shown in FIG. 3, the image playback device 20 includes a communication interface 21, a microcontroller 22, a nonvolatile recording medium 23, an image decoder 24, a display unit 25, and an input unit 26.

The communication interface 21 is an I/F circuit that communicates data with an external device via a communication cable. The image playback device 20 receives an image file from the PC 10 via the communication interface 21.

The microcontroller 22 performs overall control of the image playback device 20. The microcontroller 22 has, for example, a control function that controls reception of an image file transferred from the PC 10 via the communication interface 21 and a control function that controls playback of an image file recorded on the nonvolatile recording medium 23.

The nonvolatile recording medium 23 stores an image file transferred from the PC 10 and received by the communication interface 21. Examples of the nonvolatile recording medium 23 include a flash memory and a compact HDD.

The image decoder 24 decodes an image file read from the nonvolatile recording medium 23 under the control of the microcontroller 22.

The display unit 25 is composed of, for example, a liquid crystal display (LCD). The display unit 25 receives image data decoded by the image decoder 24 from the microcontroller 22 and displays an image on the basis of the image data.

The input unit 26 includes a variety of input keys. The input unit 26 receives a user input operation and transmits a control signal corresponding to the user input operation to the microcontroller 22.

Management and transfer operations of image files performed by the PC 10 are described in detail next. In this example, the image files 100 stored in the PC 10 are transferred to a memory area of the image playback device 20 (i.e., the area of the nonvolatile recording medium 23).

Figure 4:
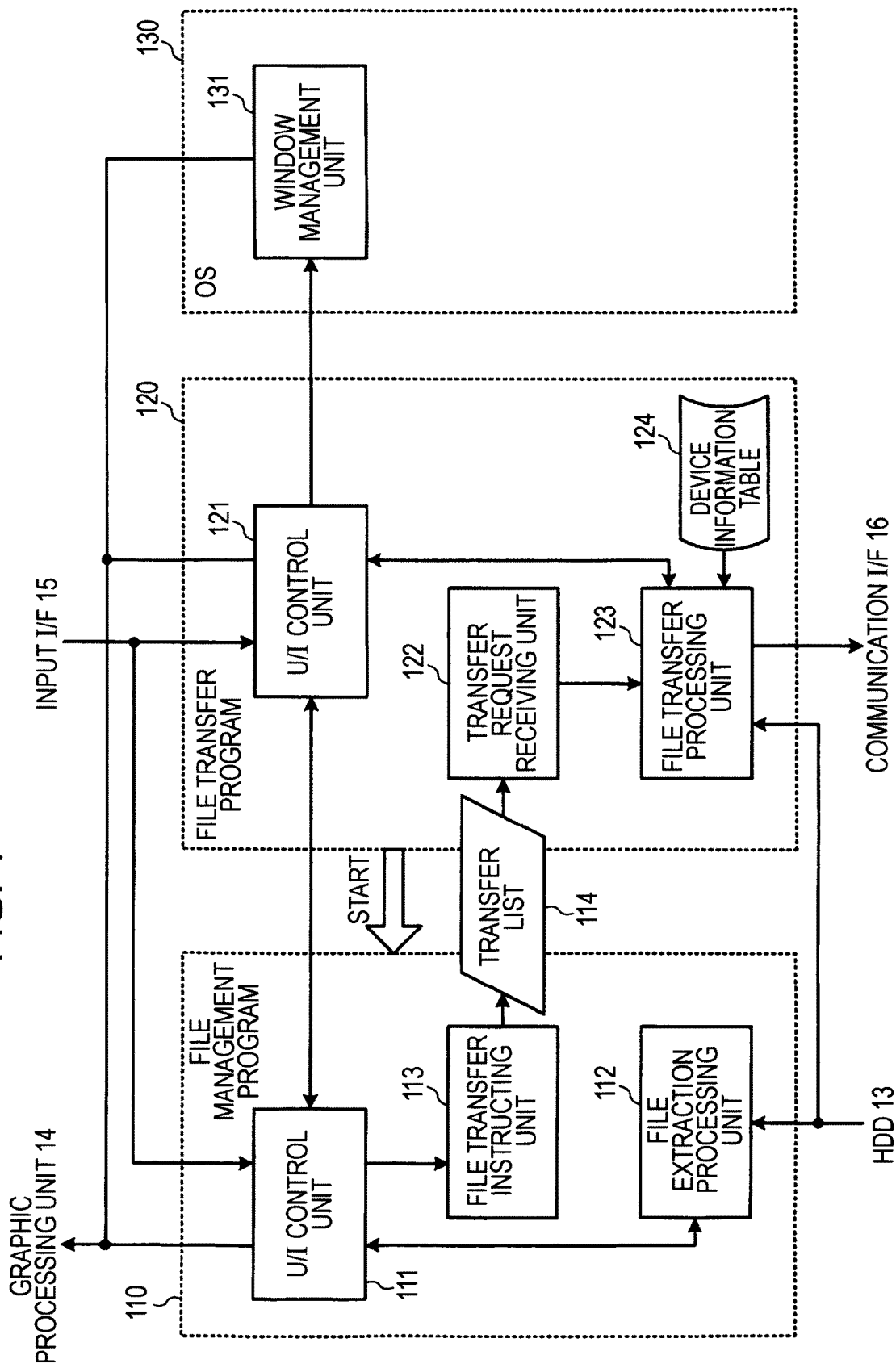
FIG. 4 is a block diagram illustrating a file management and file transfer function of the PC.

FIG. 4 is a block diagram illustrating the file management and file transfer function of the PC. When the file management program 110 is executed by the CPU 11, the PC 10 functions as: a user interface (U/I) control unit 111, a file extraction processing unit 112, and a file transfer instructing unit 113. In addition, when the file transfer program 120 is executed by the CPU 11, the PC 10 functions as: a U/I control unit 121, a transfer request receiving unit 122, and a file transfer processing unit 123. Furthermore, execution of an OS 130 allows the PC 10 to function as a window management unit 131.

The U/I control unit 111 generates image data representing a window (a file management window) that is displayed when the file management program 110 is started. The U/I control unit 111 then outputs the image data to the graphic processing unit 14, which displays the file management window on the monitor 14a. In the file management window, the thumbnail images for identifying individual image files stored in the HDD 13 are organized and displayed. In addition, the folder structure of folders that contain these image files can be displayed in the file management window.

Furthermore, the U/I control unit 111 changes the images displayed in the file management window in response to a control signal input from the input I/F 15 in accordance with a user input operation. In addition, the U/I control unit 111 informs the file extraction processing unit 112 of an extraction condition for image files. Alternatively, the U/I control unit 111 may inform the file transfer instructing unit 113 of the name of an image file to be transferred.

Upon receiving an instruction from the U/I control unit 111, the file extraction processing unit 112 sequentially extracts image files that satisfy the condition from among the image files stored in the HDD 13 and notifies the U/I control unit 111 of the information about the extracted files. For example, the file extraction processing unit 112 sorts the image files using photograph date and time information contained in the headers of the image files. Thereafter, the file extraction processing unit 112 outputs the thumbnail images to the U/I control unit 111 in the sorted order.

Upon detecting, through the U/I control unit 111, that a user performs an operation on a particular thumbnail image in the file management window in order to transfer the image file corresponding to the thumbnail image to the image playback device 20, the file transfer instructing unit 113 stores identification information about the image file to be transferred in the RAM 12 in the form of a transfer list 114. In this way, the file transfer instructing unit 113 requests transfer of that image file. More specifically, as described below, when a particular thumbnail image displayed in the file management window is dragged and dropped into a window (a file transfer window) displayed when the file transfer program 120 is started, the file transfer instructing unit 113 requests transfer of the image file corresponding to the thumbnail file.

The U/I control unit 121 generates image data representing a file transfer window and outputs the image data to the graphic processing unit 14, which displays the file transfer window on the monitor 14a. At that time, the U/I control unit 121 requests the window management unit 131 to display the file transfer window at least on top of the file management window. In addition, in response to a control signal input from the input I/F 15 in accordance with a user input operation, the U/I control unit 121 requests the file transfer processing unit 123 to change the settings for processing.

The transfer request receiving unit 122 monitors the transfer list 114 stored in the RAM 12. Each time an image file is registered with the transfer list 114, the transfer request receiving unit 122 informs the file transfer processing unit 123 of the information about the new image file. Thus, the file transfer processing unit 123 starts transfer processing.

The file transfer processing unit 123 transfers an image file indicated by the transfer request receiving unit 122 to the image playback device 20 via the communication I/F 16. The transferred image file is written to the memory area of the image playback device 20. At that time, the file transfer processing unit 123 automatically generates a folder into which the image file is to be transferred on the basis of the header information of the image file. Thereafter, the file transfer processing unit 123 starts transfer processing. In addition, the file transfer processing unit 123 changes the image size and the file format of the image file to be transferred in accordance with the specification of the external device. At that time, by referring to a device information table 124 that stores an appropriate file format for each of the external devices, the file transfer processing unit 123 can automatically convert the image file into a format suitable for the external device to which the image file is to be transferred. Note that the file transfer processing unit 123 has received various settings for the above-described operations from the U/I control unit 121.

The window management unit 131 manages the states of windows displayed on the monitor 14a. More specifically, upon detecting that a new window is open on the screen, the window management unit 131 generates a window ID for the window and holds the information about the window, such as the front-back position and the size of the window. The window management unit 131 further holds the name of a running application program corresponding to the window (e.g., the file name of the running application program).

The file management program 110 having such functions is independently started in response to a user input operation. In addition, the file management program 110 is automatically started when the file transfer program 120 is started.

In addition, the file management program 110 and the file transfer program 120 are executed by the CPU 11 in parallel in a time-sharing manner. In particular, the transfer request processing performed by the U/I control unit 111 and the file transfer instructing unit 113 realized by the file management program 110 is performed at a time point in accordance with the user input operation, regardless of whether or not image file transfer processing performed by the transfer request receiving unit 122 and the file transfer processing unit 123 realized by the file transfer program 120 is underway.

Note that the function of the U/I control unit 111 for detecting an image file transfer request and the function of the file transfer instructing unit 113 for requesting transfer processing in response to the detection may be realized by execution of the file transfer program 120.

Figure 5:
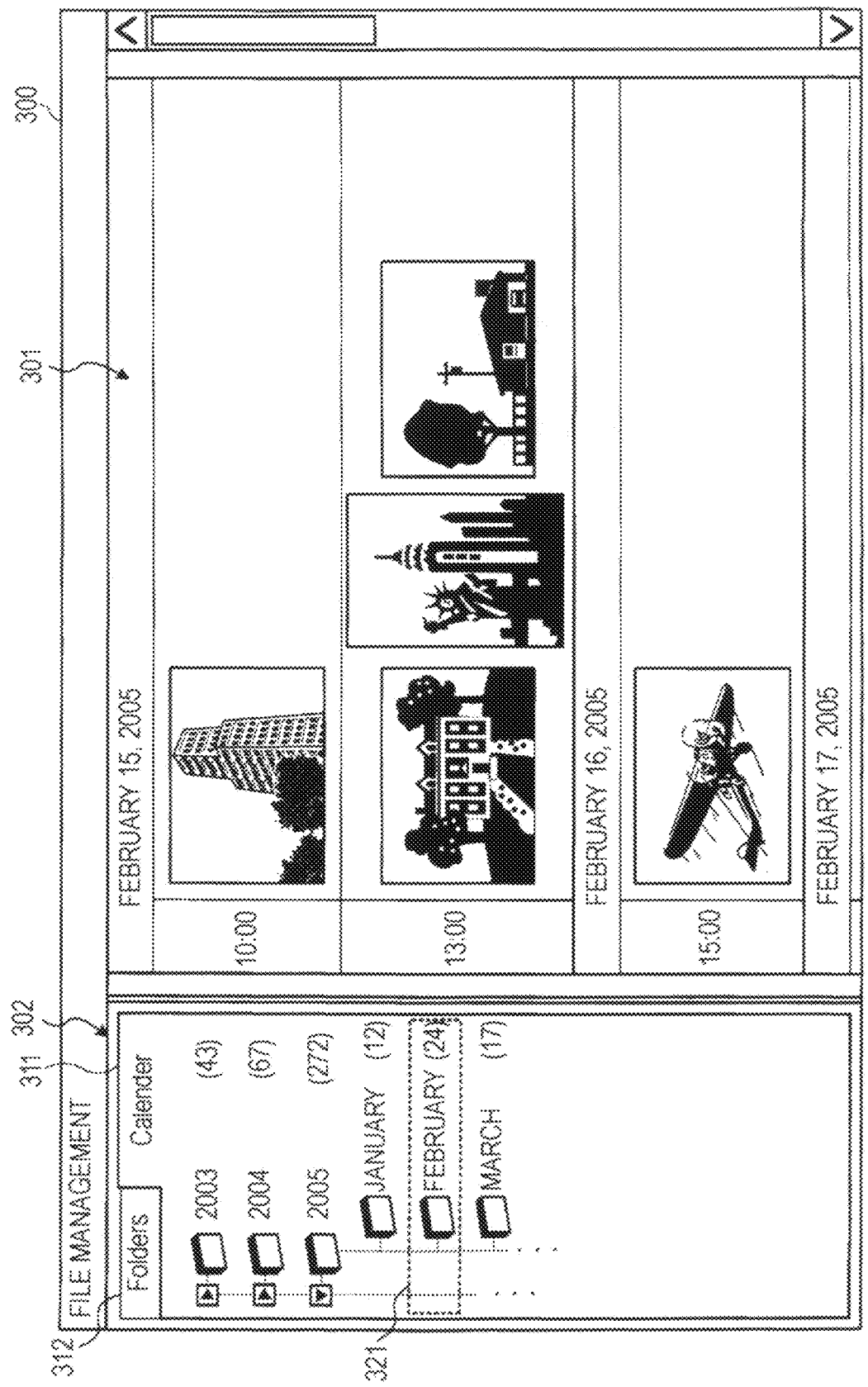
FIG. 5 illustrates an exemplary screen displayed when a file management program is started.

FIG. 5 illustrates an exemplary screen displayed when the file management program 110 is started.

When the file management program 110 is started, a file management window 300 is displayed on the monitor 14a, as shown in FIG. 5. The file management window 300 primarily includes a main display area 301 and a sub-display area 302. The list of thumbnail images of the image files sorted by the file extraction processing unit 112 is primarily displayed in the main display area 301. The directory structure of files stored in the HDD 13 and information about a method for sorting the files are primarily displayed in the sub-display area 302.

In the example shown in FIG. 5, a calendar tab 311 and a folder tab 312 are displayed in the sub-display area 302. When the user selects one of the tabs by, for example, clicking the target tab, one of two display modes can be selected.

When the calendar tab 311 is selected, a display mode is set to a mode in which the image files stored in the HDD 13 are displayed in the order in which they were captured. At that time, as indicated by the example shown in FIG. 5, the directory structure of folders layered in terms of "years" and a "months" is displayed in the sub-display area 302. By selecting one of the folders by moving a cursor 321 through a user input operation, the user can display, in the main display area 301, the thumbnail images of the image files captured in the "year" or the "month" corresponding to the selected folder in a list format.

In the example shown in FIG. 5, a folder "February" in the lowermost layer of the structure displayed in sub-display area 302 is selected, and the thumbnail images of the image files captured in February in 2005 are displayed in the main display area 301 in a list format. In this example, the thumbnail images are organized by hours of a day using the photograph date and time and are displayed in the main display area 301.

The processing for generating such a screen is schematically described next. When the calendar tab 311 is selected, the U/I control unit 111 requests the file extraction processing unit 112 to sort the image files by the photograph date and time. The file extraction processing unit 112 refers to the header information in the image files stored in the HDD 13 and sorts the image files by the photograph date and time written to the header information. Subsequently, when one of the folders displayed in the sub-display area 302 is selected, the U/I control unit 111 informs the file extraction processing unit 112 of the "year" and "month" corresponding to the selected folder. The file extraction processing unit 112 delivers, to the U/I control unit 111, the thumbnail images of the image files corresponding to the informed "year" and "month" together with the information about the photograph date and time. In this way, the U/I control unit 111 can organize the thumbnail images by the photograph date and time and display the thumbnail images in the main display area 301.

Through such processing performed by the file management program 110, even when the image files are stored at any location in the directory structure defined by the file system of the PC 10, the image files can be organized by the photograph date and time and can be displayed. Accordingly, for example, even when the user stores the image files without organizing the image files into folders of the photograph date and time, the user can easily find an image file captured at any date and time. In addition, since the image files are displayed in the form of thumbnail files, the user can recognize the content of the image files.

Figure 6:
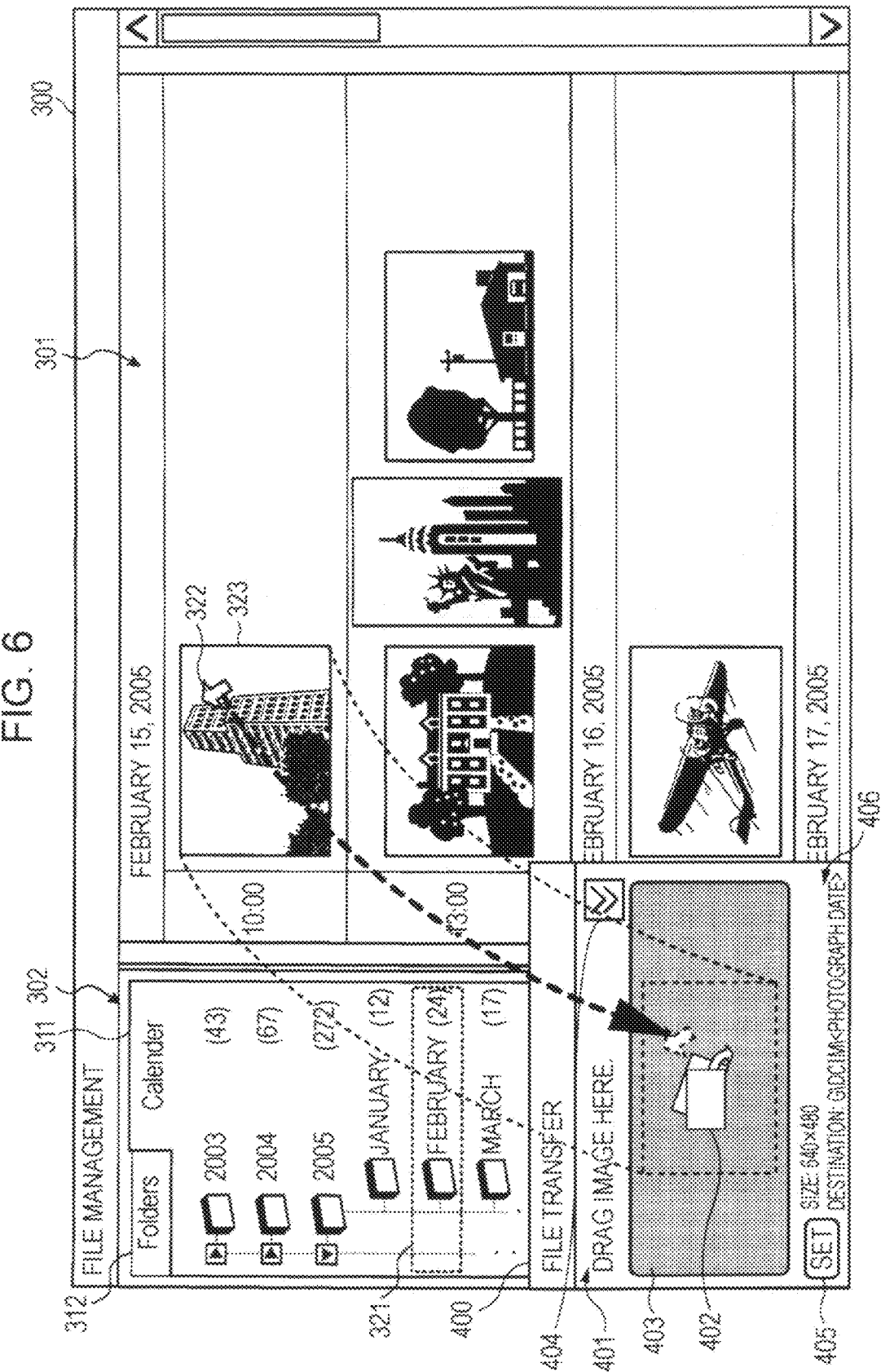
FIG. 6 illustrates an exemplary screen displayed when a file transfer program is started.

FIG. 6 illustrates an exemplary screen displayed when the file transfer program 120 is started. When the file transfer program 120 is started, a file transfer window 400 is displayed on the monitor 14a, as shown in FIG. 6. In addition, when the file transfer program 120 is started, the file management program 110 is automatically started. Thus, the file management window 300 is displayed at the same time, as shown in FIG. 5. Note that when the file management program 110 is running, the file transfer program 120 can be further started. Even in such a case, the screen as indicated by FIG. 6 is displayed.

The file transfer window 400 is a display area used for requesting file transfer of an image file to the image playback device 20. The user moves a mouse pointer 322 onto a particular thumbnail image displayed in the main display area 301 of the file management window 300. Thereafter, the user drags the thumbnail image (i.e., moves the mouse pointer 322 while pressing a mouse button) and drops the thumbnail image into the file transfer window 400 (i.e., locates the mouse pointer 322 inside the file transfer window 400 and stops pressing the mouse button). In this way, the user can request transfer of the image file in the HDD 13 corresponding to the thumbnail image. Thus, transfer processing of the image file to the image playback device 20 is started.

Here, the file transfer window 400 is displayed in the foreground of the file management window 300 at any time. Accordingly, at any time, the user can view the area into which the thumbnail image is to be dropped without performing an operation of moving a window or changing the size of a window. Therefore, when finding a desired thumbnail image in the main display area 301, the user can immediately drag and drop the thumbnail image in order to request transfer of the image file to the image playback device 20. Note that the file transfer window 400 may be displayed frontmost on the display at any time.

Furthermore, in at least the initial screen that is displayed immediately after the file transfer program 120 is started, by displaying the file transfer window 400 at a position at which an area of the main display area 301 of the file management program 110 hidden by the file transfer window 400 is minimized, the ease of performing the drag and drop operation can be increased. Instead of displaying the file transfer window 400 so that the file transfer window 400 overlaps with the file management window 300, the file transfer window 400 may be displayed as a part of the file management window 300.

In addition, in the example shown in FIG. 6, the file transfer window 400 includes a message area 401 and a status display area 403. The message area 401 is used for guiding a user to understand the operation procedure or displaying character information in order to inform a user of the current operation status. The status display area 403 is used for displaying a message image 402 in order to visually inform a user of the current operation status. For example, in accordance with a status change to a mode in which a transfer request of an image file can be received (the mode shown in FIG. 6) or a mode in which an image file is being transferred, the character information displayed in the message area 401 and the message image 402 displayed in the status display area 403 are changed. In this way, the ease of performing the operation can be increased for users.

Furthermore, the file transfer window 400 includes a size change button 404 used for changing the size of the file transfer window 400. When the size change button 404 is clicked, the display area of the file transfer window 400 is decreased so that the displayed area of the file management window 300 located in the background can be increased. Thus, thumbnail images contained in the file management window 300 are not hidden. Note that an example of a display shown when the file transfer window 400 is reduced is described below with reference to FIG. 10.

In the main display area 301, a plurality of displayed thumbnail images can be selected in one go and can be dragged and dropped into the file transfer window 400. In this way, the request of transfer of image files corresponding to these thumbnail images can be made in one operation.

When a thumbnail image is dragged and dropped into the file transfer window 400 so that a transfer request of the image file corresponding to the thumbnail image is made, the file transfer program 120 automatically creates a folder in a file system of the image playback device 20 and stores the image file in the created folder. In addition, when an image file is to be transferred, the image file is automatically converted to the image size and the file format suitable for an external device to which the image file is to be transferred.

The file transfer window 400 further includes a setting button 405. When the user clicks the setting button 405, a transfer setting window is displayed. Through the transfer setting window, the user can change the setting of file transfer, such as the conditions for creating a folder and a method for changing the image size and the file format. In the file transfer window 400, a setting information display area 406 is provided next to the setting button 405. Setting information for creating a folder is displayed in the setting information display area 406.

Figure 7:
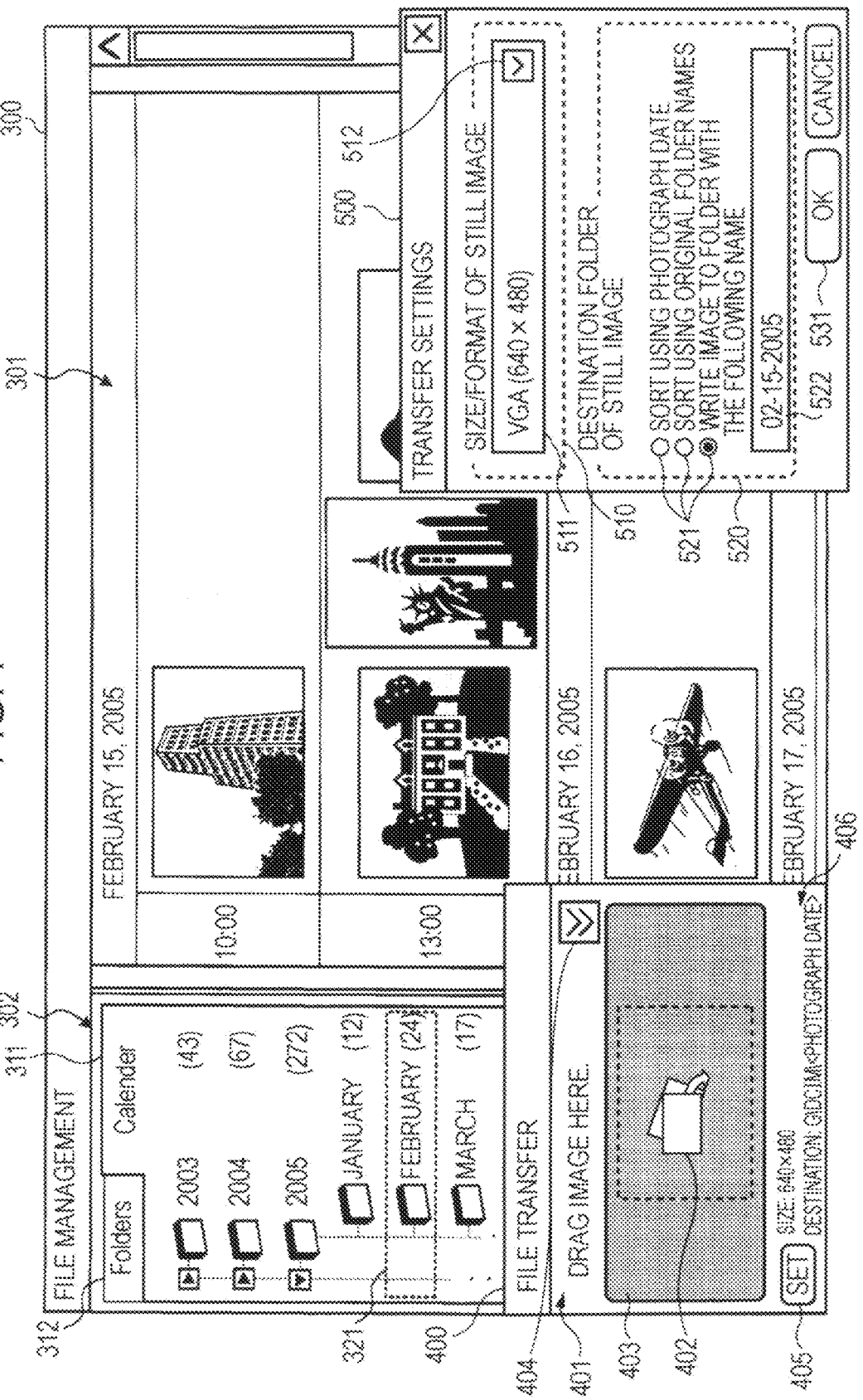
FIG. 7 illustrates an exemplary transfer setting window used for changing the setting of file transfer.

FIG. 7 illustrates an exemplary transfer setting window used for changing the setting of file transfer.

In FIG. 7, a transfer setting window 500 is displayed on top (i.e., in the "foreground") of the file management window 300 (and the file transfer window 400). The transfer setting window 500 includes a file conversion setting area 510 and a folder setting area 520. When settings are input into these areas and, subsequently, an OK button 531 is clicked, the settings are activated. The transfer setting window 500 then disappears.

The file conversion setting area 510 includes a display area 511 in which the size of a converted image and the file format are displayed. In addition, when a display button 512 is clicked, the sizes and the file formats of all convertible images are displayed in the display area 511. By moving a cursor, the user can select a desired image size and a desired file format from the displayed items.

When an external device to which an image file is to be transferred is connected to the PC 10, the file transfer processing unit 123 of the file transfer program 120, for example, acquires, from the external device, a device identification number which is uniquely assigned to the external device. Subsequently, the file transfer processing unit 123 refers to the device information table 124 and reads the image size and the file format that the connected external device can support. At that time, the file transfer processing unit 123 sends the readout information to the U/I control unit 121. In this way, the image size and the file format suitable for the connected external device can be displayed in the display area 511 in a list format so that the user can select one of the items. Thus, the file transfer processing unit 123 can receive the item selected by the user.

On the other hand, the folder setting area 520 is used for displaying options that the user can select in order to set conditions for automatically creating a folder into which an image file is to be transferred. In this example, three conditions described below are displayed. By selecting one of the three conditions using a corresponding one of selection buttons 521, the user can select a desired condition.

A first folder creation condition is that a folder is created for each of the photograph dates of the image files. In this example, a folder having a name using the photograph year, month, and day is created.

Figure 8:
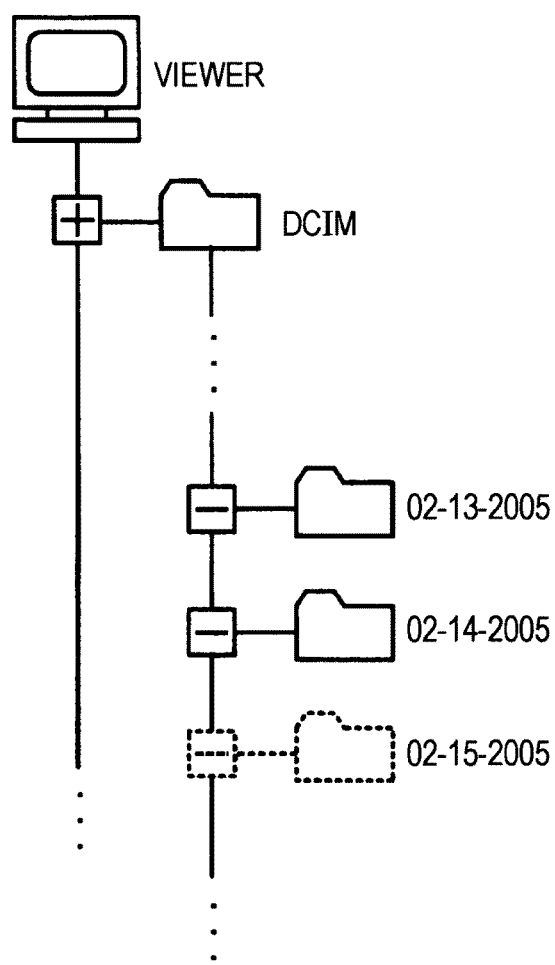
FIG. 8 illustrates an exemplary directory structure for managing data files in an image playback device.

FIG. 8 illustrates an exemplary directory structure for managing data files stored in the image playback device 20.

For example, suppose that, when a thumbnail image 323 shown in FIG. 6 is dragged and dropped into the file transfer window 400, the image file corresponding to the thumbnail image 323 has a photograph date of Feb. 15, 2005. Accordingly, the file transfer processing unit 123 creates a folder having a name "02-15-2005" at a certain location in the directory structure used for managing the memory area of the image playback device 20. The file transfer processing unit 123 then writes the image file into the created folder. In FIG. 8, the folder having a name "02-15-2005" is created inside the folder having a name "DCIM" in the directory structure of the image playback device 20. In this processing, if a folder having the same name has already been created, the image file is written into that folder.

When the first folder creation condition is selected, the file transfer processing unit 123 of the file transfer program 120 refers to the header information of the image file to be transferred and retrieves the photograph date and time and creates a folder using the photograph date and time. At that time, specification information about the file system of the external device to which the image file is to be transferred may be prestored in the device information table 124, and an appropriate folder may be created in accordance with the specification.

For example, when a plurality of folders can be created in the file system of the external device in a multilayer structure, a folder having a name based on the year in which an image file to be transferred was captured may be created first. Subsequently, inside that folder, a folder having a name based on the month and day in which the image file to be transferred was captured may be created, and the image file may be stored in that folder. Alternatively, when a Japanese folder name can be used for the file system of the external device, a folder having a name "2005 nen 2 gatsu 15 nichi" (here, "nen", "gatsu", and "nichi" represent corresponding Kanji characters) may be created, and the image file may be stored in that folder. Furthermore, the length of the name of a created folder may be adjusted so as to be less than or equal to a maximum length allowable for the file system of the external device.

By selecting the above-described first folder creation condition, the user can store an image file in a corresponding folder of the external device to which the image file is transferred in accordance with the photograph date of the image file without displaying the directory structure of the external device and creating or selecting a folder. That is, by simply dragging and dropping the thumbnail image corresponding to a desired image file into the file transfer window 400, the user can store the image file in the external device with the image file being organized. Thus, the user can easily find the image file when playing back the image file.

A second folder creation condition is that a folder having a name the same as the name of the folder of the PC 10 in which the image file is stored is created in the target external device, and the image file is written into the created folder. In this processing, the user can apply the management structure of image files created in the PC 10 to the memory area of the external device to which the image file is to be transferred.

A third folder creation condition is that the user inputs a desired file name to an input area 522 provided in the folder setting area 520 shown in FIG. 7, and a folder having this name is created in the external device to which the image file is to be transferred.

Even when the second or third folder creation condition is selected, a folder may be created at an appropriate location in the directory structure, depending on the specification of the file system of the external device to which the image file is to be transferred.

Figure 9:
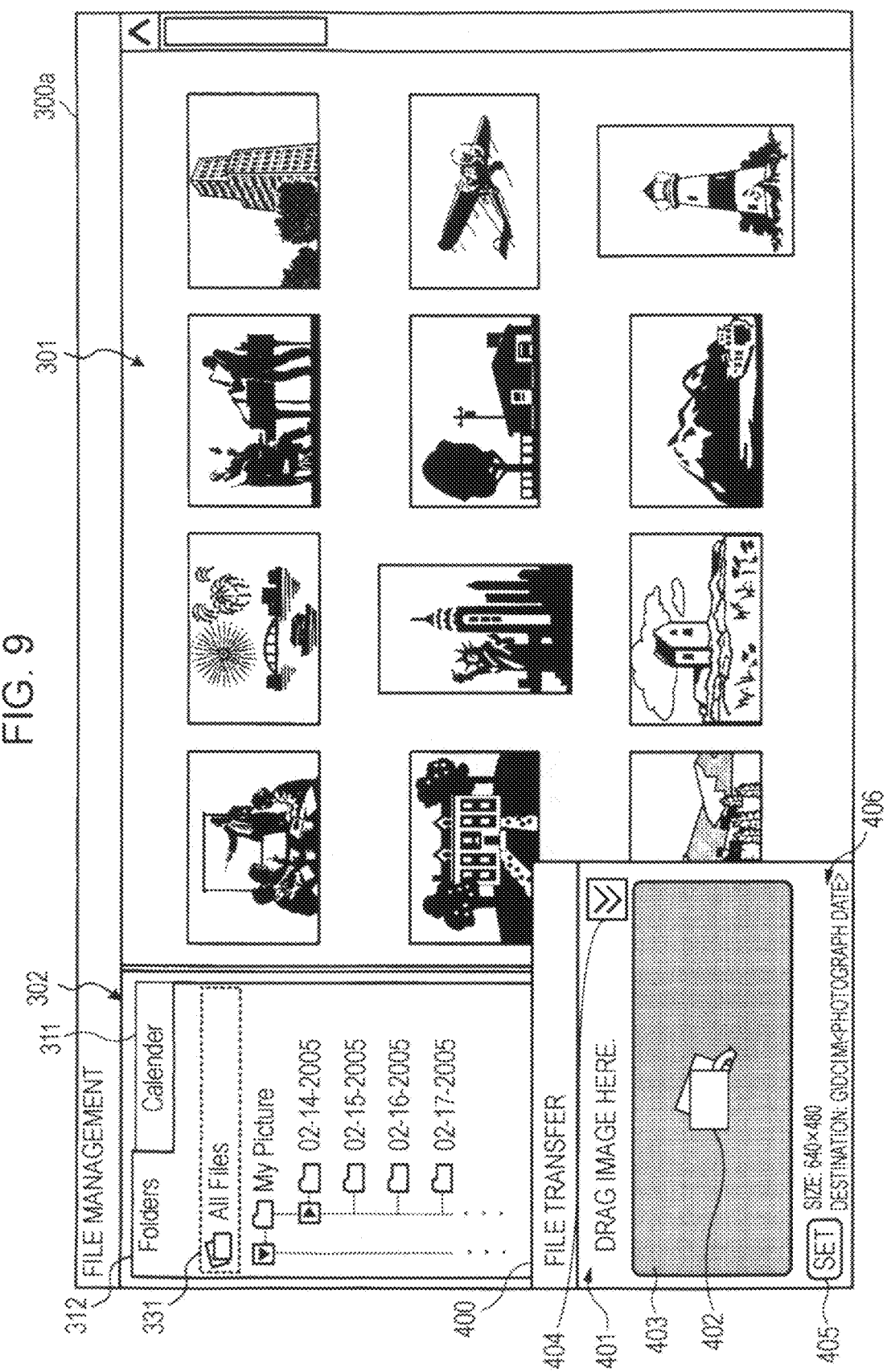
FIG. 9 illustrates an exemplary screen displayed when a folder tab is selected.

Another screen displayed when the file management program 110 is started is described next. FIG. 9 illustrates an exemplary screen displayed when a folder tab is selected.

As shown in FIG. 9, when the folder tab 312 is selected, the directory structure of the file system of the PC 10 is displayed in the sub-display area 302 of a file management window 300*a*. By moving a cursor 331 to one of folders displayed in the sub-display area 302 through an input operation so as to select the folder, the thumbnail images of image files stored in the selected folder are displayed in the main display area 301 in a list format. In the example shown in FIG. 9, a menu item named "All Files" is provided in the sub-display area 302 in addition to the directory structure. When this menu item is selected using the cursor 331, the thumbnail images of all image files stored in the HDD 13 can be displayed in the main display area 301.

When the file management window 300a having such a structure is displayed, the U/I control unit 111 informs the file extraction processing unit 112 of the locations of the image files to be extracted in accordance with the user input operation for the sub-display area 302 for selecting a folder. The file extraction processing unit 112 extracts the image files placed at the locations informed by the U/I control unit 111 and sends the thumbnail images of the extracted files to the U/I control unit 111. In addition, the file extraction processing unit 112 may send information about the directory structure. The U/I control unit 111 updates the information displayed in the main display area 301 and the sub-display area 302 on the basis of the information sent from the file extraction processing unit 112.

When the information shown in FIG. 9 is displayed and the above-described first folder creation condition, for example, is selected and if a thumbnail image in the main display area 301 is dragged and dropped into the file transfer window 400, the file transfer processing unit 123 of the file transfer program 120 recognizes the photograph date of the corresponding image file using the header information of the image file. The file transfer processing unit 123 then creates a folder having a name the same as the photograph date and stores the image file in the created folder, as described above. In this way, the folder into which the image file is to be transferred is created using the header information of the image file. Accordingly, even when, as shown in FIG. 9, the thumbnail images corresponding to all of the image files stored in the HDD 13 are simply aligned in lines, the image files to be transferred can be organized and stored into folders of photograph dates. That is, the user can store the image file in the external device with the image files being organized, regardless of the display mode of the file management window. Thus, the user can easily find a desired image file when playing back the image file.

In contrast, when the information shown in FIG. 9 is displayed and the above-described second folder creation condition, for example, is selected and if a thumbnail image in the main display area 301 is dragged and dropped into the file transfer window 400, the file transfer processing unit 123 of the file transfer program 120 creates, in the target external device, a folder having a name the same as the name of a folder of the PC 10 in which the corresponding image file is stored. The file transfer processing unit 123 then writes the image file into the created folder.

For example, in the sub-display area 302 shown in FIG. 9, when the cursor 331 is moved to a folder having a name "02-16-2005", the thumbnail images of image files stored in the folder are displayed in the main display area 301 in a list format. At that time, if a desired thumbnail image in the main display area 301 is dragged and dropped into the file transfer window 400, a folder having the same name "02-16-2005" is created in the image playback device 20. The corresponding image file is then written into the created folder.

Furthermore, if the icon or the character string representing the folder in the sub-display area 302 shown in FIG. 9 is dragged and dropped into the file transfer window 400, all of the image files in the folder are transferred into the folder having the same name in the target external device.

As described above, by applying the second folder creation condition, the user can create, in the memory area of the target external device, the management structure of image files that is the same as the management structure created in the PC 10. Accordingly, the file transfer processing based on the second folder creation condition is suitable for users who organizes image files in the PC 10 on a folder-to-folder basis so as to find a desired image file easily.

Figure 10:
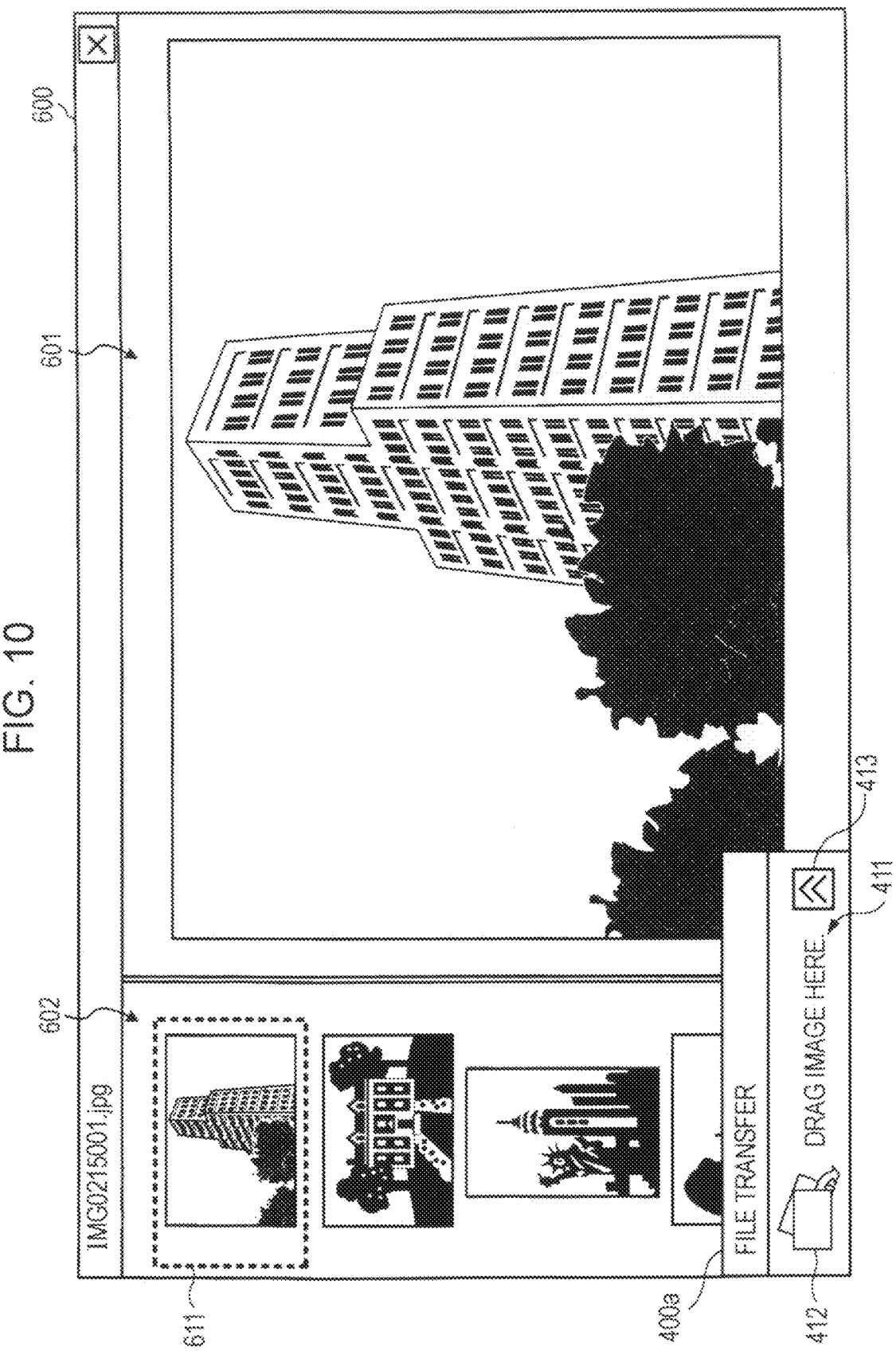
FIG. 10 illustrates an exemplary screen displayed when an image is enlarged.

FIG. 10 illustrates an exemplary screen displayed when an image is enlarged.

For example, when a thumbnail image displayed in the main display area 301 shown in FIG. 6 or 9 is double-clicked (the mouse button is continuously clicked twice), the image corresponding to the thumbnail image can be enlarged through the processing performed by the file management program 110. In the example shown in FIG. 10, the enlarged image is displayed in an enlargement display window 600 which is different from the file management window 300 or 300a.

An enlarged image is displayed in an enlarged image display area 601 of the enlargement display window 600. In addition, in this example, a thumbnail display area 602 is further provided in the enlargement display window 600. The thumbnail images that were displayed in the main display area 301 of the original file management window are displayed in the thumbnail display area 602 in a list format. In the thumbnail display area 602, when a cursor 611 is moved by a user input operation so that a thumbnail image is selected, an enlarged image corresponding to the thumbnail image is displayed in the enlarged image display area 601.

Like the file transfer window 400, a file transfer window 400a is used for requesting transfer, to the image playback device 20, of the file of an image dragged and dropped therein. The file transfer window 400a is displayed in the foreground of the enlargement display window 600 at any time. By dragging and dropping an enlarged image displayed in the enlarged image display area 601 or a thumbnail image displayed in the thumbnail display area 602 into the file transfer window 400a, the image file corresponding to the dragged and dropped image can be transferred to the image playback device 20. Note that the processing of folder creation and file conversion is similar to that as described above.

In addition, in the initial state in which the enlargement display window 600 is displayed, the file transfer window 400a having an area smaller than the file transfer window 400 is displayed, as shown in FIG. 10. In this way, an area that hides the background enlarged image and the thumbnail images is minimized. In the reduced file transfer window 400a, only a minimum number of items, such as a message area 411 for displaying a message that informs the user of an operation procedure or the operation status, a message image 412 that visually informs a user of the operation status, and a size change button 413 used for displaying the file transfer window 400a of the above-described large size, are displayed.

In addition, when the size change button 404 provided in the file transfer window 400 shown in FIGS. 6 and 9 is clicked, the file transfer window 400a reduced in a manner as described in FIG. 10 is displayed.

In the above-described processing, the process of requesting of image file transfer using a drag and drop operation and the process of transferring the requested image file to the image playback device 20 through the above-described operation are executed in parallel in a time-sharing manner. More specifically, the following processes are executed in parallel: each of a detection process of a drag and drop operation performed by the U/I control unit 111 and a registration process of an image file in the transfer list 114 performed by the file transfer instructing unit 113; and each of a receiving process of a transfer request from the transfer list 114 performed by the transfer request receiving unit 122, an image file conversion process and a folder creation process performed by the file transfer processing unit 123, and a file writing process.

Accordingly, for example, after dragging and dropping a desired thumbnail image (or a folder displayed in the sub-display area 302 or an enlarged image displayed in the enlarged image display area 601), the user can continuously drag and drop the next thumbnail image without waiting for completion of a series of processes for transferring the image file corresponding to the thumbnail image to the image playback device 20. Therefore, the user can concentrate on selecting a desired image file to be transferred using the file management window 300, the file management window 300a, or the enlargement display window 600. In addition, since, as described above, the user is not necessary to create a folder in which the image file is to be transferred, the user can transfer an image file with a significantly simple operation.

When a series of transfer processes of an image file is executed in response to a drag and drop operation, the sizes of the message areas 401 and 411 and the message images 402 and 412 in the file transfer windows 400 and 400a are changed. For example, in the message area 401, character string information "Drag an image here" for guiding the user to understand the drag and drop operation is displayed in the initial state. Immediately after a drag and drop operation is performed, character string information "Transferring image file xxx to folder yyy" for informing a user of execution of a transfer process is displayed until transfer of all of the requested image files is completed. By viewing a message changing in this manner, the user can visually monitor the state of the execution of the transfer process.

Figure 11:
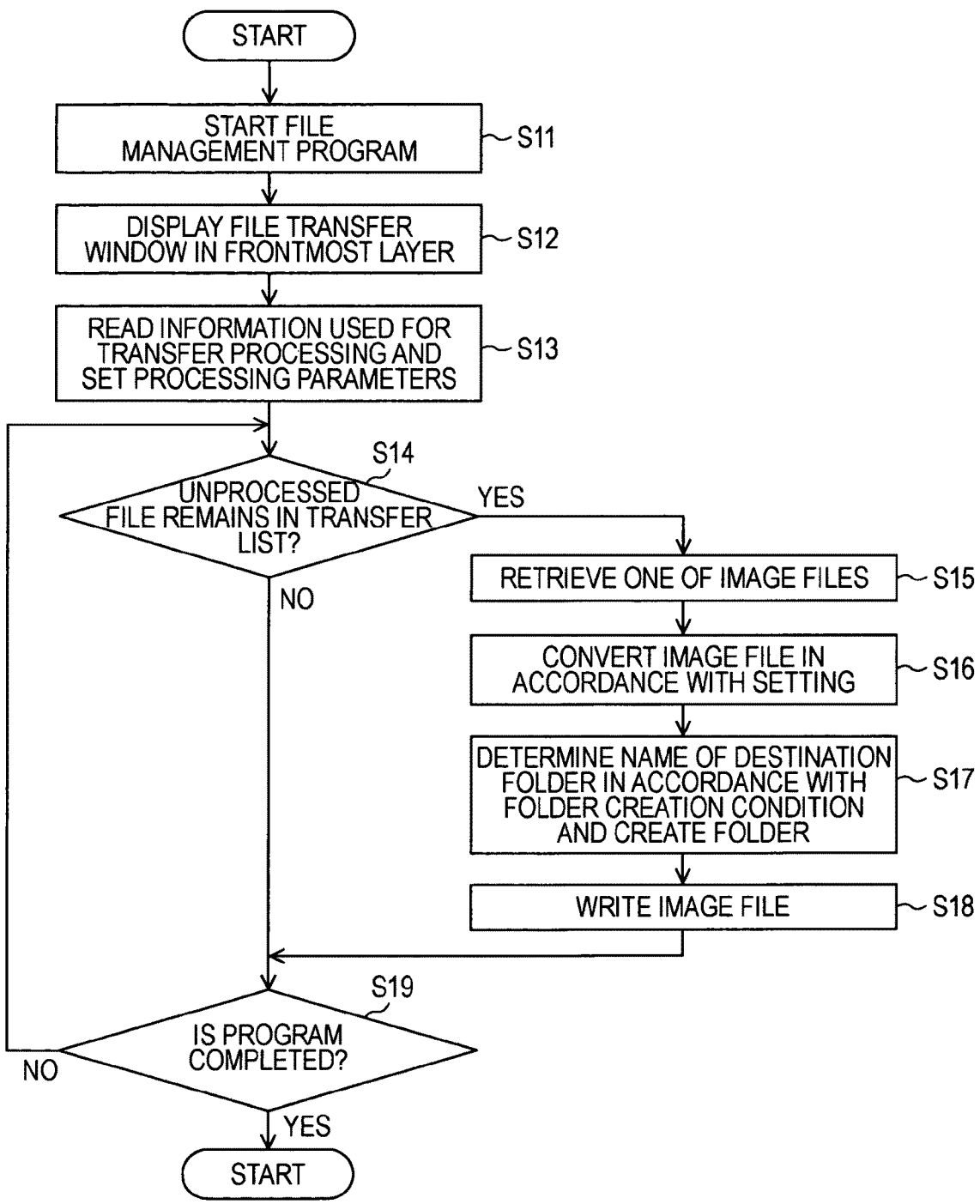
FIG. 11 is a flow chart illustrating the processing procedure of the file transfer program when an image file is transferred.

The processing procedure performed by the PC 10 when an image file is transferred in this manner is described next with reference to a flow chart. FIG. 11 is a flow chart illustrating the processing procedure of the file transfer program when an image file is transferred.

When the file transfer program 120 is started in response to a user input operation, the file management program 110 is concurrently started (step S11). Accordingly, for example, the above-described file management window 300 is displayed on the monitor 14a. Thereafter, the U/I control unit 121 displays the file transfer window 400 on the monitor 14a (step S12). At that time, the U/I control unit 121 requests the window management unit 131 of the OS 130 to display the file transfer window 400 in the foreground of the file management window 300 (e.g., in the frontmost layer).

Subsequently, the file transfer processing unit 123 reads information used for the transfer process from the HDD 13 and sets processing parameters in the RAM 12 (step S13). In this way, the PC 10 is ready for receiving an image file transfer request.

In step S13, for example, it is determined which external device is a device to which the image file is to be transferred (the image playback device 20, in this example). Subsequently, the specification information about the external device is read from the device information table 124. At that time, if a user selectable parameter, such as an image size and an image format, is present, a default parameter is set as an initial parameter first. Thereafter, in accordance with an input from the user through the transfer setting window 500, the processing parameter is appropriately changed. In addition, for example, the first folder creation condition of the above-described folder creation conditions is read and set as a default setting. Thereafter, in accordance with an input from the user through the transfer setting window 500, the folder creation condition is changed.

Subsequently, the transfer request receiving unit 122 refers to the transfer list 114 stored in the RAM 12 at predetermined intervals so as to determine whether a new registered image file that is not subjected to a transfer process is present (step S14). If unprocessed registered image files are found, the transfer request receiving unit 122 informs the file transfer processing unit 123 of the identification information about the image files in a first-in first-out fashion. The file transfer processing unit 123 retrieves the image file corresponding to the received identification information from the HDD 13 (step S15).

Subsequently, the file transfer processing unit 123 performs an image-size and file-format conversion process on the retrieved image file in accordance with the processing parameter set in step S13 (step S16). The file transfer processing unit 123 then determines the name of a folder to which the image file is to be transferred in accordance with the selected folder creation condition and creates a folder in the directory structure of the image playback device 20 (step S17). Subsequently, the file transfer processing unit 123 writes the image file converted in step S16 into the created folder (step S18). If a folder having a name the same as the name determined in step S17 has already been created in the directory structure, the image file is appended into the folder.

When the image file transfer is completed in step S18 or if no unprocessed image files are found in the transfer list 114 in step S14, it is determined whether a user input operation for completing the execution of the file transfer program 120 is performed (step S19). If a user input operation is not performed, the processing in step S14 is performed again. Accordingly, each time a new image file is appended to the transfer list 114, the processing from steps S15 to S18 is performed. In addition, even when a plurality of image files are registered in the transfer list 114 in one go, the processing from steps S15 to S18 is sequentially performed for each of the registered image files. However, if, in step S19, a user input operation for completing the execution of the file transfer program 120 is performed, termination processing of the execution of the file transfer program 120 and the file management program 110 is performed.

Figure 12:
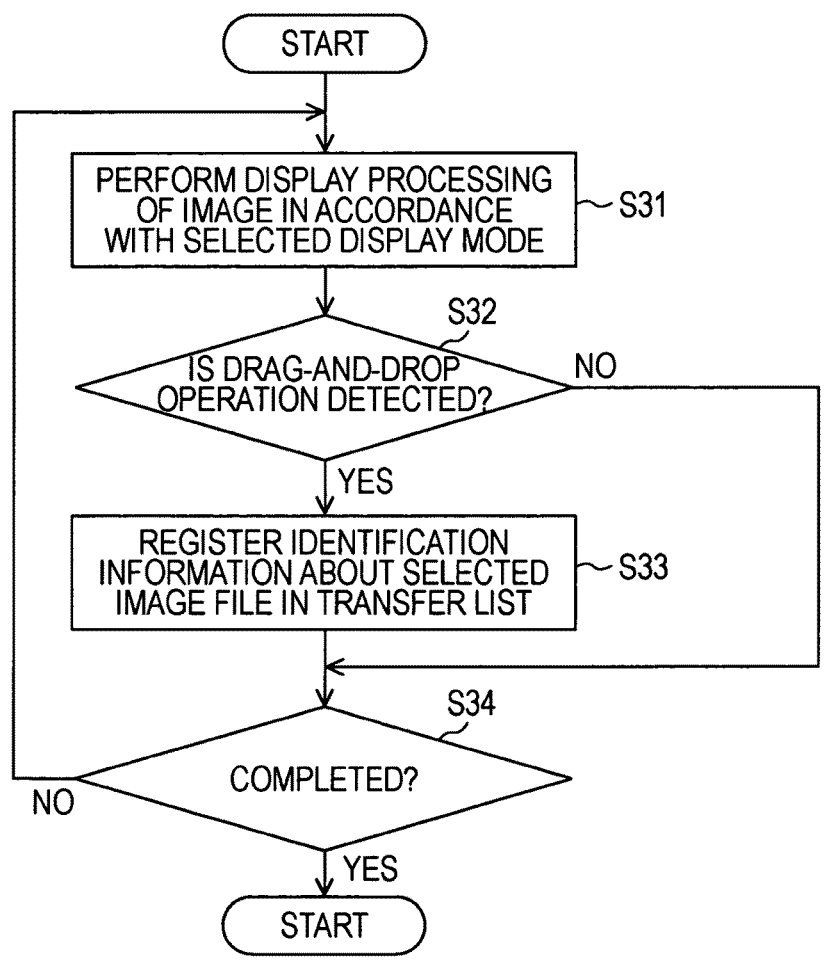
FIG. 12 is a flow chart illustrating the processing procedure of the file management program while the file transfer program is running.

FIG. 12 is a flow chart illustrating the processing procedure performed by the file management program while the file transfer program is running.

In step S11, upon receiving a start request from the file transfer program 120, execution of the file management program 110 starts. First, a display process of an image in accordance with the selected display mode is performed by the U/I control unit 111 and the file extraction processing unit 112 (step S31). For example, the file management window 300, as shown in FIG. 6, the file management window 300a, as shown in FIG. 9, and the enlargement display window 600, as shown in FIG. 10, are displayed on the monitor 14a.

Subsequently, the U/I control unit 111 detects whether a drag and drop operation of a displayed thumbnail image, folder, or enlarged image into the file transfer window 400 or 400a is performed (step S32). For example, the U/I control unit 111 can detect performance of a drag and drop operation into the file transfer window 400 or 400a by acquiring the positional information indicating the display areas of the file transfer windows 400 and 400a from the U/I control unit 121.

Upon detecting a drag and drop operation, the file transfer instructing unit 113 receives the identification information corresponding to the image file to be transferred from the U/I control unit 111 and registers the identification information in the transfer list 114 (step S33). At that time, for example, if a plurality of thumbnail images are dragged and dropped in one go or a folder is dragged and dropped, the identification information about all of the corresponding image files are informed to the file transfer instructing unit 113. Thus, the identification information about all of the corresponding image files is appended to the transfer list 114.

When the processing performed in step S33 is completed or if a drag and drop operation is not detected in step S32, the U/I control unit 111 determines whether execution of the file transfer program 120 is completed (step S34). If execution of the file transfer program 120 is not completed, the processing returns to step S31. Thereafter, a drag and drop operation is detected at predetermined intervals. However, if execution of the file transfer program 120 is completed, execution of the file management program 110 is completed as well.

The above-described processing performed by the file management program 110 shown in FIG. 12 and the above-described processing performed by the file transfer program 120 shown in FIG. 11 are independent and are performed by the CPU 11 in parallel. Accordingly, for example, even when the processing of file transfer in steps S14 to S18 shown in FIG. 11 is executed, the user is allowed to execute the processing relating to a drag and drop operation in steps S32 and S33 shown in FIG. 12 by selecting a desired image file and dragging and dropping a thumbnail file corresponding to the image file.

In the above-described embodiment, a user is not necessary to create a folder of the image playback device 20 to which an image file is to be transferred. In addition, by simply performing a drag and drop operation, a user can transfer an image file to the image playback device 20 and store the image file with the image files being organized so that a desired image file can be easily found when the image file is used. Furthermore, at that time, the user can automatically convert the image file so that the image file has a size and a file format suitable for the specification of the image playback device 20 without any input operations. Still furthermore, even when a series of image file transfer processes is executed, the user can sequentially search for the next desired image file to be transferred and request file transfer of the image file by using a drag and drop operation. Accordingly, the ease of performing the operation can be increased for users.

In the file transfer process in which a folder to which an image file is to be transferred is automatically created, in addition to using the photograph date information stored in the header of the image file, the folder may be created using other information in the header. Examples of pieces of information stored in the header include identification information about a person captured in the image and positional information indicating a photograph location acquired using a global positioning system (GPS) at a photograph time. One of such pieces of information may be used for the names of folders, and the image files may be organized using the folders. Alternatively, instead of referring to the header information, a person in a captured image, for example, may be identified by analyzing the image file, and a folder may be created on the basis of the identification information.

In addition, the functions of the above-described embodiment serving as an image management unit and an image transfer unit may be realized by not only a PC but also a portable device, such as various types of computer, a personal digital assistant (PDA), or a cell phone, having a configuration similar to that shown in FIG. 2. In addition, the functions may be realized by an image capturing apparatus that captures an image and generates an image file.

Furthermore, while the foregoing embodiment has been described with reference to still image files serving as content data files managed by a PC and transferred to an external device, the present invention is not limited thereto. For example, the present invention can be applied to a moving image file, an audio file, a document file, and a drawing file.

In the file management windows shown in FIGS. 6 and 9, a thumbnail image is used for an identification image for identifying each data file. However, an icon capable of being used for identifying the file name and the file format of the data file may be displayed for the identification image. When the present invention is applied to a moving image file, a thumbnail image of an image representative of the playback moving image may be used for the identification image.

Still furthermore, when a folder to which image files are to be transferred is automatically created, the folder may be created on the basis of the creation date of the data file (e.g., a year, a day, or a time) so that the transferred files are organized. In such a case, the identification images of the data files can be sorted by the creation date of the data file and can be displayed in the file management window.

The processing functions of the above-described embodiment can be realized by a computer. In such a case, a program that describes the processing procedure of the PC (the file management apparatus and the file transfer apparatus) is provided. By executing the program using the computer, the above-described processing functions can be realized by the computer. In addition, the program that describes the processing procedure can be recorded in a computer-readable recording medium. Examples of the computer-readable recording medium include a magnetic recording medium, such as a magnetic tape or a hard disk, an optical disk, a magneto-optical recording medium, and a semiconductor memory.

In order to distribute the program, a removable recording medium, such as an optical disk, storing the program may be made available to market, for example. In addition, the program can be stored in a storage unit of a server computer and can be transferred from the server computer to another computer via a network.

The computer for executing the program stores, in a storage unit connected thereto, the program, for example, recorded in a removable medium or transferred from the server computer. Subsequently, the computer reads out the program from the storage unit and performs processing in accordance with the program. Alternatively, the computer can directly read out the program from a removable medium and performs processing in accordance with the program. Furthermore, each time the program is transferred from the server computer, the computer performs processing in accordance with the received program.

It should be understood by those skilled in the art that various modifications, combinations, sub-combinations and alterations may occur depending on design requirements and other factors insofar as they are within the scope of the appended claims or the equivalents thereof.

What is claimed is:

1. A method for transferring a content image file stored in a storage unit from a file transfer apparatus to a storage area of an external device, the method comprising the steps of:
  (a) displaying a file display window and a file transfer window on a display unit using display processing unit of the file transfer apparatus so that the file transfer window is displayed at a location where the file transfer window is not hidden by the file display window, the file display window displaying at least one file identification image for identifying one of at least one image file stored in the storage unit, the file transfer window being used for receiving a request for transferring an image file to the external device; and
  upon detecting a drag and drop operation of a file identification image displayed in the file display window into the file transfer window using input detecting unit of the file transfer apparatus, (b) reading the image file corresponding to the file identification image from the storage unit and writing the readout image file to the storage area of the external device using transfer processing unit of the file transfer apparatus, wherein whenever both the file display window and file transfer window are displayed, the file transfer window is automatically displayed in the foreground of the file display window and is automatically displayed in a size that is smaller than the size of the file display window, wherein the file transfer window includes a setting button which a user can select to cause display of a transfer setting window, and wherein the transfer setting window presents the user with a plurality of selectable folder creation conditions, each of the folder creation conditions specifying a respective criterion for automatically creating a folder in the external device for storing an image file to be transferred to the external device, wherein automatically creating a folder comprises automatically creating a folder based on attribution information of the image file, the attribution information being acquired when the image file was captured, and wherein the size of the file transfer window is changed according to a view of the file display window.

2. The method according to claim 1, wherein the attribution information is positional information indicating a photograph location at a photograph time.

3. The method according to claim 1, wherein the attribution information is identification information regarding a person captured in an image corresponding to the image file.

4. The method according to claim 3, wherein the transfer processing unit determines the name of the folder into which the image file is to be written on the basis of a creation date of the image file included in the header.

5. The method according to claim 4, wherein, when the image file to be transferred is an image file, the transfer processing unit determines the name of the folder into which the image file is to be written on the basis of photograph date and time information included in the header.

6. The method according to claim 3, wherein the transfer processing unit sets the name of the folder into which the image file is written to be the same as a name of a folder in which the image file to be transferred is originally stored in a directory structure of the storage unit for managing a location of a stored file in the storage unit.

7. The method according to claim 1, wherein, in step (b), when drag and drop operations of a plurality of the file identification images displayed in the file display window are continuously performed, a process for detecting an input of the drag and drop operation using the input detecting unit and a process for writing the image file to be transferred to the storage area of the external device using the transfer processing unit are executed in parallel.

8. The method according to claim 7, wherein step (b) involves:

each time the input detecting unit detects an input of a drag and drop operation of a file identification image displayed in the file display window into the file transfer window, sequentially registering identification information about the image file corresponding to the file identification image in a transfer list;

occasionally monitoring the step of registering identification information; and writing, to the storage area of the external device, the image file corresponding to the identification information that is not subjected to a transfer process.

9. The method according to claim 1, wherein, in step (b), the transfer processing unit converts an image file to be transferred into a an image file capable of being successfully played back by the external device connected to the transfer processing unit in accordance with specification information about the external device and writes the converted image file into the storage area of the external device.

10. The method according to claim 9, wherein, if the image file to be transferred is an image file, the transfer processing unit converts an image size of the image file into an image size reproducible and displayable on the external device.

11. The method according to claim 1, wherein, in step (a), the display processing unit extracts the image file that satisfies a predetermined extraction condition from the storage unit and displays the file identification image corresponding to the extracted image file in the file display window in a list format.

12. A non-transitory computer-readable medium having stored thereon a computer-readable file transfer program for transferring a content image file stored in a storage unit to a storage area of an external device, the file transfer program comprising program code for causing a computer to function as:

display processing unit to display a file display window and a file transfer window on a display unit so that the file transfer window is displayed at a location where the file transfer window is not hidden by the file display window, the file display window including at least one file identification image for identifying one of at least one image file stored in the storage unit, the file transfer window being used for receiving a request for transferring an image file to the external device;

input detecting unit to detect an input of a drag and drop operation of a file identification image displayed in the file display window into the file transfer window; and transfer processing unit to read the image file corresponding to the file identification image from the storage unit and writing the readout image file to the storage area of the external device when the input detecting unit detects an input of a drag and drop operation of the file identification image, wherein whenever both the file display window and file transfer window are displayed, the file transfer window is automatically displayed in the foreground of the file display window and is automatically displayed in a size that is smaller than the size of the file display window, wherein the file transfer window includes a setting button which a user can select to cause display of a transfer setting window, and wherein the transfer setting window presents the user with a plurality of selectable folder creation conditions, each of the folder creation conditions specifying a respective criterion for automatically creating a folder in the external device for storing an image file to be transferred to the external device, wherein automatically creating a folder comprises automatically creating a folder based on attribution information of the image file, the attribution information being acquired when the image file was captured, and wherein the size of the file transfer window is changed according to a view of the file display window.

13. A file transfer apparatus for transferring a content image file stored in a storage unit to a storage area of an external device, the apparatus comprising:

a processor configured to operate as:

a display processing unit configured to display a file display window and a file transfer window on a display unit so that the file transfer window is displayed at a location where the file transfer window is not hidden by the file display window, the file display window including at least one file identification image for identifying one of at least one image file stored in the storage unit, the file transfer window being used for receiving a request for transferring an image file to the external device;

an input detecting unit configured to detect input of a drag and drop operation of a file identification image displayed in the file display window into the file transfer window; and a transfer processing unit configured to read the image file corresponding to the file identification image from the storage unit and write the readout image file to the storage area of the external device when the input detecting unit detects an input of a drag and drop operation of the file identification image, wherein whenever both the file display window and file transfer window are displayed, the file transfer window is automatically displayed in the foreground of the file display window and is automatically displayed in a size that is smaller than the size of the file display window, wherein the file transfer window includes a setting button which a user can select to cause display of a transfer setting window, and wherein the transfer setting window presents the user with a plurality of selectable folder creation conditions, each of the folder creation conditions specifying a respective criterion for automatically creating a folder in the external device for storing an image file to be transferred to the external device, wherein automatically creating a folder comprises automatically creating a folder based on attribution information of the image file, the attribution information being acquired when the image file was captured automatically creating a folder comprises, and wherein the size of the file transfer window is changed according to a view of the file display window.

* * * * *